(12) United States Patent
Curet et al.

(10) Patent No.: US 8,419,890 B2
(45) Date of Patent: Apr. 16, 2013

(54) COMPOSITION FOR STRUCTURAL ADHESIVE

(75) Inventors: Arnaud Curet, Senlis (FR); Régis David, Chaville (FR)

(73) Assignee: Jacret, Le Thillay (FR)

( * ) Notice: Subject to any disclaimer, the term of this patent is extended or adjusted under 35 U.S.C. 154(b) by 331 days.

(21) Appl. No.: 12/521,147

(22) PCT Filed: Dec. 24, 2007

(86) PCT No.: PCT/EP2007/064532
§ 371 (c)(1),
(2), (4) Date: Sep. 29, 2009

(87) PCT Pub. No.: WO2008/080913
PCT Pub. Date: Jul. 10, 2008

(65) Prior Publication Data
US 2010/0084092 A1 Apr. 8, 2010

(30) Foreign Application Priority Data

Dec. 27, 2006 (FR) ...................................... 06 11442
Jul. 26, 2007 (FR) ...................................... 07 05491

(51) Int. Cl.
C04B 37/00 (2006.01)
B32B 27/00 (2006.01)
C08L 53/00 (2006.01)
C09J 7/02 (2006.01)

(52) U.S. Cl.
USPC ............. 156/325; 156/334; 524/505; 525/89

(58) Field of Classification Search ................. 156/325, 156/334; 524/505; 525/89
See application file for complete search history.

(56) References Cited

U.S. PATENT DOCUMENTS

| | | | |
|---|---|---|---|
| 4,451,615 | A | 5/1984 | Charnock |
| 5,106,917 | A | 4/1992 | Lee et al. |
| 6,433,091 | B1 | 8/2002 | Cheng |
| 2003/0212212 | A1* | 11/2003 | Wen et al. ..................... 525/222 |
| 2004/0229990 | A1* | 11/2004 | Righettini et al. ............ 524/445 |
| 2005/0014901 | A1 | 1/2005 | Osae et al. |
| 2005/0238603 | A1 | 10/2005 | Themens et al. |

FOREIGN PATENT DOCUMENTS

| | | |
|---|---|---|
| EP | 1466953 A1 | 10/2004 |
| JP | 5163444 A | 6/1993 |
| JP | 2002226509 A | 8/2002 |
| WO | WO-2007/075909 A1 | 7/2007 |

OTHER PUBLICATIONS

DuBois, Donn et al., "High Performance Styrenic Block Copolymers Featuring a Novel Hybrid Midblock Phase", Adhesives & Sealants Council Meeting, Louisville, KY, Oct. 9-12, 2005.

* cited by examiner

*Primary Examiner* — Michael Orlando
(74) *Attorney, Agent, or Firm* — Novak Druce Connolly Bove + Quigg LLP

(57) ABSTRACT

The invention relates to composition for an acrylic structural adhesive containing a mixture of block copolymers containing styrene and an elastomer.

20 Claims, No Drawings

COMPOSITION FOR STRUCTURAL ADHESIVE

RELATED APPLICATIONS

This application is a national stage application (under 35 U.S.C. §371) of PCT/EP2007/064532, filed Dec. 24, 2007, which claims benefit of French application 0611442, filed Dec. 27, 2006 and French application 0705491, filed Jul. 26, 2007.

The present invention relates to the field of acrylic structural adhesives (based on an acrylate or methacrylate) and to their applications.

Structural adhesives are a good alternative to other mechanical techniques for binding two materials together, such as metals or plastics. This is because there is better force distribution by bonding than when alternative techniques such as riveting or welding are used. In addition, the use of bonding often allows more rapid working and also has the advantage of providing better insulation from external elements (dust, moisture) than mechanical technologies.

Structural adhesives are thus used in many industrial fields, even though they do have certain disadvantages. In fact, the bond created during the curing (setting) of the adhesive is often rigid when good mechanical strength is necessary. Thus, if the elasticity of the adhesive is insufficient, fracture may be observed when the two parts bonded together are made to undergo forces moving them apart. Adhesives having good elasticity do exist, but they are often of low mechanical strength.

It is therefore necessary to identify structural adhesives having both good mechanical strength (especially shear strength) and satisfactory elasticity. Moreover, it is important for these properties to be observed on various types of material, and especially on metal and on composites.

The present invention aims to solve the abovementioned problems by providing an adhesive composition having an elongation at break equal to or greater than 70%, preferably 90% and more preferably 100% and a tensile shear strength greater than 15 MPa on aluminum.

Structural adhesives are composed of two elements, namely a catalyst serving for polymerizing or curing the other element, which contains monomers.

The invention thus relates to a composition that can be used in a structural adhesive, comprising:
(a) at least one methacrylate ester monomer;
(b) an elastomeric block copolymer containing styrene and isoprene;
(c) at least one elastomeric block copolymer containing styrene and butadiene or ethylene; and
(d) at least one elastomer chosen in such a way that its Hildebrand solubility parameter is compatible with the Hildebrand solubility parameters of the block copolymers used.

The composition according to the invention will thus be used with a curing catalyst.

U.S. Pat. No. 4,451,615 discloses heat-resistant compositions that can be used as a structural adhesive, comprising an acrylate ester monomer and an isoprene-containing block polymer. This polymer may be an isoprene homopolymer, an isoprene/acrylonitrile copolymer or an SIS.

US 2005/0014901 discloses a composition containing an alkyl methacrylate or acrylate monomer, an unsaturated polyester or vinyl ester resin, and a completely or partially thermoplastic polymer or elastomer.

JP 05-163 444 discloses an adhesive containing an alkyl methacrylate and a block copolymer containing aromatic vinyl monomers and isoprene or isoprene/butadiene.

JP 2002-226509 discloses an adhesive containing an acrylate monomer and a styrene-containing block copolymer which may in particular be chosen from SBS, SIS, SEBS and SEPS.

EP 1 466 953 discloses adhesive compositions containing SIS and SBS, and also a tackifying resin. This adhesive contains neither a methacrylate ester monomer nor an elastomer.

WO 2007/075909 discloses compositions comprising a methacrylate ester monomer, a block copolymer chosen from a linear SBS copolymer, a radial SBS copolymer and a plasticizer, a linear or radial SIS copolymer, a linear or radial SIBS copolymer, and blends thereof. The presence of an elastomer is not envisioned.

In a preferred embodiment, the ester monomer (a) is a methacrylate monomer. It is preferred to choose a methacrylate monomer in which the alcohol part has a short linear chain (i.e. having one or two carbon atoms). Thus, the preferred monomers according to the invention are methyl methacrylate and ethyl methacrylate.

In another embodiment, the alcohol part has at least one ring, which may or may not be substituted. Thus, in this embodiment, the monomers may especially be chosen from: tetrahydrofurfuryl methacrylate, phenoxyethyl methacrylate, isobornyl methacrylate, glycidyl ether methacrylate, benzyl methacrylate, cyclohexyl methacrylate and trimethyl cyclohexyl methacrylate.

Mixtures of these esters may also be used. The percentage by weight of methacrylate in the composition is preferably between 20 and 80%, more preferably between 30 and 65% and even more preferably between 42 and 58%, i.e. around 50%.

In one particular embodiment, the composition also contains at least one acrylic ester monomer (e) in which the alcohol part has a linear chain of at least 6 carbon atoms (a long-chain monomer). Thus, it is preferred to use lauryl methacrylate, 2-ethylhexyl methacrylate, 2-ethylhexyl acrylate, esters based on polyethylene glycol, or mixtures of these esters. It is preferable for the composition to contain at most 10%, preferably at most 8% or even at most 5% by weight in total of these acrylic long-chain monomers. In one particular embodiment, the composition comprises a mixture of two acrylic long-chain ester monomers. Preferably, when the composition contains only a single acrylic ester monomer (e), it is preferable for this to be present in an amount of 8% by weight or less, although it is acceptable for there to be an amount of between 8 and 10% when the composition contains a mixture of these esters (e). In this case, it is preferred for each to be present in at most 5%.

The composition may also contain other monomers, such as acrylonitrile, methacrylonitrile or styrene.

The composition according to the invention also comprises a blend of various block copolymers. Thus, it comprises (b) a styrene-isoprene-styrene block copolymer (SIS) and (c) at least one block copolymer containing styrene and butadiene or ethylene. When it contains butadiene, this block copolymer may be a styrene-butadiene-styrene copolymer (SBS) or a styrene-isoprene-butadiene-styrene copolymer (SIBS), such as Kraton MD6455 (from the company Kraton Polymers) described by Dr. Donn DuBois et al. at the conference Adhesives & Sealants Council Meeting, Louisville, Ky., 9-12 Oct. 2005.

When it contains ethylene, this block copolymer may be an SEBS (styrene/ethylene-butylene/styrene copolymer) or an SEPS (styrene/ethylene-propylene/styrene copolymer). These compounds are available in the Kraton G range (from Kraton Polymers).

In the preferred embodiment of the invention, the block copolymer (c) contains butadiene.

Preferably, styrene is present in a proportion of between 15 and 50%, more preferably between 22 and 40% and even more preferably about 28-33% by weight of the SBS copolymer. It is present in a proportion of between 12 and 24% and more preferably about 18-19% by weight in the SIS or SIBS copolymers.

Preferably, the composition contains a blend of an SIS and an SIBS in a proportion varying from 4-1 (by weight in the composition) to 1.5-1. The preferred proportion of SIS to SIBS is about 3/1 or 3.3/1. However, it is also possible to use an SIS/SBS blend in the same relative proportions as the SIS/SIBS blend. It is also possible to use a blend of SIS, SIBS and SBS. Another block copolymer may also be added to one of these blends.

The block copolymers SIS, SBS or SIBS that can be used according to the invention are well known to those skilled in the art. They are produced in particular by the company Kraton Polymers (Houston, Tex., USA). Thus, it is possible to use the SIS Kraton D1160 disclosed in US 2005 0238603 or Kraton D1161, the SBS Kraton D1102 described in U.S. Pat. No. 5,106,917 and the SIBS Kraton MD6455 or Kraton MD 6460.

The person skilled in the art knows how to select the SIS, SIBS and SBS block copolymers that can be used in the composition according to the invention from those that exist, in particular according to their solubility in the monomers used, or according to their tensile strength.

Preferably, the composition according to the invention comprises between 10 and 30%, preferably between 15 and 25% and more preferably between 18 and 25% by weight of the blend of said SIS block copolymer and said block copolymer containing butadiene or ethylene.

The composition according to the invention also contains at least one elastomer chosen in such a way that it is compatible in solution with the block copolymers used. If necessary, it is functionalized (having a double bond at its ends, in particular methacrylate functional groups to improve the bonding with the monomers). In certain cases, a liquid elastomer is chosen. It is preferred to use at least one functionalized elastomer, either by itself or as a mixture with at least one nonfunctionalized elastomer.

In particular, said elastomer is chosen such that its Hildebrand solubility parameter is compatible with the Hildebrand solubility parameters of the block copolymers used. In particular, it is chosen in such a way that its solubility parameter does not differ by more than 10% from the average of the Hildebrand solubility parameters of the block copolymers used (for example 8.3 $(cal \cdot cm^{-3})^{1/2}$ in the case of the SIBS MD6455). The Hildebrand solubility parameter is well known and calculated by the square root of the cohesive energy density of the compound. The Hildebrand solubility parameter is directly related to the dispersion forces (Van der Waals forces) that are exerted between the molecules of a chemical substance. In particular, the Hildebrand solubility parameter (expressed in $cal^{1/2}\ cm^{-3/2}$) of the elastomer is between 8 and 9 (between 16 and 19 when the solubility parameters are expressed in $MPa^{1/2}$).

Thus, it is preferred to use elastomers of the polybutadiene type (the polybutadiene then being preferably liquid and functionalized) or polyisoprene type. A polychloroprene (Neoprene AD10, from DuPont, USA) may also be used.

A functionalized polybutadiene, such as Hycar VTB 2000x168 (with vinyl terminal groups), by itself or as a blend with a nonfunctionalized polybutadiene, such as Hycar CTB 2000x162 (carboxyl terminal groups) (from Emerald Performance Materials (EPM), Cuyahoga Falls, Ohio, USA) may be used.

This component (d) is favorably present in an amount of between 4 and 20%, preferably between 6 and 15% and more preferably between 8 and 12% by weight in the composition according to the invention.

The relative proportions of the block copolymer/elastomer blend are between 4/1 and 1/1, preferably about 2/1, by weight in the composition.

The composition according to the invention may also contain an acid monomer such as an acid monomer that can be polymerized by free radicals, known in the art, of the unsaturated carboxylic acid, maleic acid, crotonic acid, isophthalic acid and fumaric acid type. Methacrylic acid or acrylic acid is preferred.

The composition according to the invention may also contain, in its preferred embodiments, at least one additional compound chosen from a curing accelerator, a rheology modifier and an adhesion promoter.

The curing accelerator serves to promote the polymerization and curing of the adhesive when the catalyst is added. This is a tertiary, preferably aromatic, amine such as dimethyl para-toluidine and/or 2,2'-(p-tolylimino)diethanol.

The rheology modifier serves to ensure that the composition according to the invention has the proper viscosity, so that it can be easily applied to the surfaces to be bonded. Polyamides such as Disparlon 6500 (from Kusumoto Chemicals Ltd, Japan) may be used.

The adhesion promoter is especially a methacrylated phosphate ester, such as the phosphate ester 2-hydroxyethyl methacrylate (Genorad 40 from Rahn A G, Zurich, Switzerland).

Other components, such as mineral fillers ($TiO_2$, $CaCO_3$, $Al_2O_3$, zinc phosphate), ultraviolet stabilizers (such as 2-hydroxyphenyltriazine, Tinuvin 400 from Ciba-Geigy), and wax, may also be added to the composition according to the invention. Free-radical polymerization inhibitors, such as BHT, or benzoquinones such as naphthoquinone, hydroquinone or ethylhydroquinone may also be added to increase the lifetime of the composition.

It is known that structural adhesives are formed from two components, these being a composition according to the invention and a catalyst for curing and setting the adhesive. These two components are stored in two different compartments and are mixed together at the time of application of the adhesive.

This catalyst is a free-radical polymerization initiator, particularly a peroxide-based one, and is well known in the art. Benzoyl peroxide, tert-butylperoxybenzoate or cumene hydroperoxide may especially be chosen. It is preferred when the catalyst contains between 5 and 40% peroxide by weight, in particular about 20% peroxide by weight. A paste containing about 20% benzoyl peroxide is especially used.

The catalyst is used in a ratio from 1/1 to 1/30, preferably from 1/5 to 1/30 and even more preferably about 1/10 relative to the second component, which is the composition according to the invention.

The invention is therefore based on the fact that the combined use of an elastomeric block copolymer of styrene/isoprene/styrene type, of an elastomeric block copolymer containing butadiene or ethylene and of at least one elastomer having a Hildebrand solubility parameter compatible with the Hildebrand solubility parameters of the block copolymers used makes it possible to obtain a composition for a structural adhesive that has an elongation at break equal to or greater than 70%, preferably 90% and more preferably 100%, and a tensile shear strength equal to or greater than 15 MPa or even 17 MPa (on aluminum).

This result is completely unexpected, since this adhesive thus has properties greatly superior to those described in the art. Moreover, this adhesive also has excellent mechanical strength when it is used on a composite. In fact, it is commonly found that the mechanical strength values observed on a metal are not always repeated on a composite.

The use of a composition according to the invention therefore makes it possible to bond metals, plastics and composites to a composite and thus can be applied in particular in the field of silo, boat or truck trailer construction. It may be also used in the automotive construction field or the railroad field.

Thus, the composition enables a material to be adhesively bonded to another material, one or the other material being especially a metal, a plastic, wood or a composite. The composition may therefore be used in one or more of the following applications: metal/metal, metal/composite, metal/plastic, metal/wood, wood/plastic, wood/composite, wood/wood, plastic/composite, plastic/plastic or composite/composite adhesion.

The composition according to the invention is thus particularly advantageous when a material has to be bonded to a composite.

The flexible methacrylate structural adhesives having high mechanical performance obtained with the composition according to the invention are resilient and resistant to shocks and vibrations. They make it possible to produce adhesive joints between materials of the same or different chemical nature, for example: concrete, wood, ceramics, glass, ferrites, aluminum, anodized aluminum, steel, galvanized steel, stainless steel, painted metal, steel, copper, zinc, ABS, PVC, polyester, acrylics, polystyrene, gel-coat polyester or epoxides, composites, glass-fiber-reinforced composites, laminates, honeycomb structures and any painted or lacquered material.

They may also fill large gaps between substrates of different or variable thickness, roughness or flatness, with better stress distribution.

The flexibility of this composition thus allows the differential expansion forces between the substrates to be taken up over great lengths of several meters, while reducing or eliminating geometrical (angle, roughness, flatness) defects.

The applications and activity sectors involved comprise, in particular:

Bonding of reinforcements, rails, frame structures, beams, stiffeners, panels, partitions, fasteners, supports, body components, reinforcing brackets, inserts, cylindrical and conical components, hinges, frames, etc.; bonding with lamination take-up on partitions, bonding with filling, requiring high mechanical strength; especially bonding of any bonded structural or mechanical component from the following fields: ship building, automotive, railroad (and infrastructure), aeronautical, aerospace, electronic, electromechanical and domestic electrical equipment, military structures, indicating (and advertising) signs and panels, urban furniture, exterior joinery (windows, glazed bays, window doors, entry doors and garage doors), wind machines, containers, engineering structures and infrastructures (especially suspension bridges, offshore oil platforms and aircraft hangars), construction and fastening, curtain walling and solar panels.

EXAMPLES

The examples below illustrate the invention without restricting the scope thereof.

Example 1

Raw Materials Used and Methodology

The following components were used:
methacrylate ester monomer (a): methyl methacrylate (MMA);
acrylate ester monomer (e): laurylmethacrylate (LauMA), 2-ethylhexyl acrylate (2EHA);
SIS copolymer (b): Kraton D1160 (Kraton Polymers);
SBS copolymer (c): Kraton D1102 (Kraton Polymers); or
SIBS copolymer (c): Kraton MD6455 (Kraton Polymers);
functionalized liquid elastomer (d): Hycar® VTB 2000×168 (EPM, USA);
nonfunctionalized liquid elastomer (d): Hycar® CTB 2000×162 (EPM, USA);
acid monomer: methacrylic acid (MAA);
adhesion promoter: phosphate methacrylate Genorad 40 (Rahn AG);
curing accelerator: dimethyl-para-toluidine (DMPT);
rheology modifier: Disparlon 6500 (Kusumoto Chemicals); and
catalyst: benzoyl peroxide at 20%.

The tests according to the following protocols were carried out:
the ISO 527 standard was used to carry out the tests for measuring the tensile strength TS, the elongation at break EB and the elastic modulus or Young's modulus YM. The elongation was observed using a method well known to those skilled in the art described in particular by the ISO 527 standard, the pull rate of the adhesive being a constant 50 mm/min;
the tensile shear strength (SS) was measured according to the ISO 4587 standard. Briefly, 2024T3 aluminum test pieces measuring 100×25×1.6 mm (L×W×T) were used. Two test pieces were bonded to each other, the overlap area being 25×12 mm (300 mm$^2$), with an adhesive joint thickness of about 200 to 400 µm. The force needed to break the adhesive joint was then measured by pulling on the two test pieces; and
the tensile peel strength (PS) was evaluated according to the ISO 14173 standard. Aluminum test pieces measuring 100×25×1.5 mm or galvanized steel test specimens measuring 100×25×0.8 mm were used, these being bonded with an overlap of 75×25 mm and an adhesive joint thickness of about 500 µm.

Results

|  | Specimen | | | | | |
| --- | --- | --- | --- | --- | --- | --- |
|  | 1 | 2 | 3 | 4 | 5 | 6 |
| MMA | 54 | 54 | 54 | 54 | 54 | 54 |
| Kraton D1102 | 21 | 21 | — | — | — | — |
| Kraton D1160 | — | — | 21 | 21 | — | — |
| Kraton MD6455 | — | — | — | — | 21 | 21 |
| VTB 2000×168 | 10 | 10 | 10 | 10 | 10 | 10 |
| 2EHA | 5 | — | 5 | — | 5 | — |
| LauMA | — | 5 | — | 5 | — | 5 |
| MAA | 5 | 5 | 5 | 5 | 5 | 5 |
| Genorad 40 | 3 | 3 | 3 | 3 | 3 | 3 |

-continued

|  | Specimen | | | | | |
|---|---|---|---|---|---|---|
|  | 1 | 2 | 3 | 4 | 5 | 6 |
| DMPT | 1 | 1 | 1 | 1 | 1 | 1 |
| Disparlon 6500 | 1 | 1 | 1 | 1 | 1 | 1 |
| Total (by weight) | 100 | 100 | 100 | 100 | 100 | 100 |

The specimens tested contained the block copolymer (b) or a block copolymer (c) according to the invention with an elastomer (d).

The results obtained were the following:

|  | Specimen | | | | | |
|---|---|---|---|---|---|---|
|  | 1 | 2 | 3 | 4 | 5 | 6 |
| SS (MPa) on aluminum | 22 | 19.1 | 21.1 | 18.1 | 20.3 | 21.8 |
| PS (N/mm) on aluminum | 12.4 | 13.8 | 20.5 | 12.0 | 16.4 | 11.3 |
| PS (N/mm) on galvanized steel | 8.9 | 12.9 | 17.2 | 17.0 | 10.8 | 16.7 |
| TS (MPa) | 12.4 | 14.0 | 9.4 | 10.2 | 11.5 | 11.3 |
| EB (%) | 43.2 | 53.2 | 50.2 | 50.8 | 88.0 | 66.1 |
| YM (MPa) | 268 | 295.7 | 173.8 | 185.4 | 181.2 | 193.6 |

These results demonstrate that the presence of only two elements chosen from (b), (c) and (d) make it possible to obtain a good tensile shear strength on aluminum, but an insufficient elongation at break, this being less than 100%.

Thus, other compounds were tested:

|  | Specimen | | | |
|---|---|---|---|---|
|  | 7 | 8 | 9 | 10 |
| MMA | 54 | 50.2 | 50.2 | 54 |
| Kraton D1102 | 5 | — | — | 5 |
| Kraton D1160 | 16 | 16 | 16 | — |
| Kraton MD6455 | — | 5 | 5 | 16 |
| VTB 2000x168 | 10 | 10 | 10 | 10 |
| 2EHA | 2.5 | 8.8 | 5 | 2.5 |
| LauMA | 2.5 | — | 3.8 | 2.5 |
| MAA | 5 | 5 | 5 | 5 |
| Genorad 40 | 3 | 3 | 3 | 3 |
| DMPT | 1 | 1 | 1 | 1 |
| Disparlon 6500 | 1 | 1 | 1 | 1 |
| Total (by weight) | 100 | 100 | 100 | 100 |

These specimens contained a mixed blend of compounds (b), (c) and (d), specimen 10 being a new specimen in which compound (b) was absent.

The results obtained were the following:

|  | Specimen | | | |
|---|---|---|---|---|
|  | 7 | 8 | 9 | 10 |
| SS (MPa) on aluminum | 18.1 | 20.5 | 21.2 | 24.3 |
| PS (N/mm) on aluminum | 15.8 | 17.3 | 18.0 | 9.6 |
| PS (N/mm) on galvanized steel | 25.1 | 17.5 | 16.2 | 15.7 |
| TS (MPa) | 10.4 | 9.6 | 10.2 | 10.0 |
| EB (%) | 112.6 | 251.0 | 205.7 | 26.1 |
| YM (MPa) | 182.2 | 95.7 | 143.5 | 166.3 |

It is clearly apparent that the combined presence of components (b), (c) and (d) enables an excellent tensile shear strength to be maintained while obtaining an unexpected effect on the elongation at break (elasticity), which then becomes greater than 100%.

It should also be noted that the observed peel strength and tensile strength results are maintained.

New specimens were tested:

|  | Specimen | | | | | |
|---|---|---|---|---|---|---|
|  | 7 | 11 | 13 | 8 | 12 | 14 |
| MMA | 54 | 64 | 55.7 | 50.2 | 60.2 | 55.7 |
| Kraton D1102 | 5 | 5 | 7 | — | — | — |
| Kraton D1160 | 16 | 16 | 23 | 16 | 16 | 23 |
| Kraton MD6455 | — | — | — | 5 | 5 | 7 |
| VTB 2000x168 | 10 | — | — | 10 | — | — |
| 2EHA | 2.5 | 2.5 | 2.2 | 8.8 | 8.8 | 4.3 |
| LauMA | 2.5 | 2.5 | 2.1 | — | — | — |
| MAA | 5 | 5 | 5 | 5 | 5 | 5 |
| Genorad 40 | 3 | 3 | 3 | 3 | 3 | 3 |
| DMPT | 1 | 1 | 1 | 1 | 1 | 1 |
| Disparlon 6500 | 1 | 1 | 1 | 1 | 1 | 1 |
| Total (by weight) | 100 | 100 | 100 | 100 | 100 | 100 |

These specimens confirm the importance of the presence of compound (d). It should be noted that since compound (d) was present in an amount of 10% by weight in the composition for specimens 7 and 8, the whole of this percentage was added to the methyl methacrylate (specimens 11 and 12) or distributed partially over the monomer and compounds (b) and (c), while maintaining the maximum initial proportions (specimens 13 and 14).

The following results were obtained:

|  | Specimen | | | | | |
|---|---|---|---|---|---|---|
|  | 7 | 11 | 12 | 8 | 13 | 14 |
| SS (MPa) on aluminum | 18.1 | 18.3 | 16.8 | 20.5 | 24.3 | 16.8 |

-continued

|  | Specimen | | | | | |
| --- | --- | --- | --- | --- | --- | --- |
|  | 7 | 11 | 12 | 8 | 13 | 14 |
| PS (N/mm) on aluminum | 15.8 | 7.9 | 4.9 | 17.3 | 12.9 | 5.4 |
| PS (N/mm) on galvanized steel | 25.1 | 11.3 | 6.9 | 17.5 | 14.9 | 8.7 |
| TS (MPa) | 10.4 | 7.7 | 5.8 | 9.6 | 6.4 | 4.1 |
| EB (%) | 112.6 | 7.0 | 31.5 | 251.0 | 12.0 | 49.0 |
| YM (MPa) | 182.2 | 213.7 | 63.0 | 95.7 | 154.2 | 25.4 |

These results demonstrate the importance of the presence of compound (d) in order to obtain an elongation at break greater than 100%.

Other formulations were also tested:

|  | Specimen | | | | |
| --- | --- | --- | --- | --- | --- |
|  | A | B | C | D | E |
| MMA | 52.2 | 54.2 | 56.2 | 52.2 | 50.2 |
| Kraton D1160 | 16 | 16 | 16 | 16 | 16 |
| Kraton MD6455 | 5 | 5 | 5 | 5 | 5 |
| Hycar VTB 2000x168 | 8 | 6 | 4 | 0 | 5 |
| Hycar CTB 2000x162 | 0 | 0 | 0 | 8 | 5 |
| 2EHA | 8.8 | 8.8 | 8.8 | 8.8 | 8.8 |
| MAA | 5 | 5 | 5 | 5 | 5 |
| Genorad 40 | 3 | 3 | 3 | 3 | 3 |
| DMPT | 1 | 1 | 1 | 1 | 1 |
| Disparlon 6500 | 1 | 1 | 1 | 1 | 1 |
| Total (by weight) | 100 | 100 | 100 | 100 | 100 |

The following results were obtained:

|  | Specimen | | | | |
| --- | --- | --- | --- | --- | --- |
|  | A | B | C | D | E |
| SS (MPa) on aluminum | 21.2 | 22.6 | 24.0 | 15.6 | 17.3 |
| PS (N/mm) on aluminum | 18.0 | 17.0 | 23.6 | 13.5 | 23.6 |
| PS (N/mm) on galvanized steel | 17.7 | 15.8 | 15.0 | 8.5 | 10.0 |
| TS (MPa) | 12.8 | 10.9 | 12.1 | 7.3 | 7.9 |
| EB (%) | 138.7 | 92.9 | 71.1 | 35.3 | 108.0 |
| YM (MPa) | 221.9 | 212.4 | 224.1 | 156.6 | 136.6 |

Adhesion to a Composite:

The bonding test was carried out by adhesion of galvanized steel to a polyester gel-coat.

The adhesion quality was rated according to the following convention:

| Specimen | Galvanized steel/polyester gel-coat adhesion |
| --- | --- |
| 1 | ++ |
| 2 | ++ |
| 3 | ++/+++ |
| 4 | ++/+++ |
| 5 | ++/+++ |
| 6 | +/++ |
| 7 | +++ |
| 8 | +/++ |
| 9 | +++ |
| 10 | + |
| 11 | +/++ |
| 12 | + |
| 13 | − |
| 14 | − |

+++: excellent
++: good
+: moderate
−: poor

It may be seen that the adhesion to a composite is very satisfactory in the case of the compositions according to the invention.

The invention claimed is:

1. A composition that can be used in a structural adhesive, comprising:
    (a) 20-80% by weight of at least one methacrylate ester monomer;
    (b) an elastomeric block copolymer styrene-isoprene-styrene;
    (c) at least one elastomeric block copolymer selected from a styrene-butadiene-styrene copolymer (SBS) and a styrene-isoprene-butadiene-styrene copolymer (SIBS); and
    (d) 4-20% by weight of at least one elastomer, wherein said elastomer is polybutadiene,
wherein said composition comprises between 10 and 30% by weight of the mixture of said elastomeric block copolymer (b) and said elastomeric block copolymer (c), and the proportion of said elastomeric block copolymer (b) to said elastomeric block copolymer (c) is 4:1 to 1.5:1, and wherein said composition has an elongation at break equal to or greater than 70%.

2. The composition as claimed in claim 1, characterized in that it comprises between 6 and 15% of said polybutadiene (d) by weight.

3. The composition as claimed in claim 1, characterized in that it comprises between 15 and 25% by weight of the mixture of said elastomeric block copolymer (b) and said elastomeric block copolymer (c).

4. The composition as claimed in claim 1, characterized in that it also comprises at least one acrylate ester monomer in which the alcohol part has at least one linear chain of at least 6 carbon atoms (e).

5. The composition as claimed in claim 4, characterized in that said one acrylate ester monomer (e) is a methacrylate or acrylate monomer.

6. The composition as claimed in claim 4, characterized in that it contains a mixture of two acrylate monomers (e).

7. The composition as claimed in claim 4, characterized in that it comprises less than 10% by weight of acrylate monomer (e).

8. The composition as claimed in claim 1, characterized in that it also contains at least one additional compound chosen from a curing accelerator, a rheology modifier, an adhesion promoter and an acid monomer.

9. A method for preparing a composition that can be used as a structural adhesive, wherein said composition has an elongation at break equal to or greater than 70% and a tensile shear strength equal to or greater than 15 MPa on aluminium, comprising mixing at least one methacrylate ester monomer; an elastomeric block copolymer styrene-isoprene-styrene; at least one elastomeric block copolymer selected from a styrene-butadiene-styrene copolymer (SBS) and a styrene-isoprene-butadiene-styrene copolymer (SIBS); and polybutadiene to form a composition, wherein said composition comprises 20-80% by weight of at least one methacrylate ester monomer, between 10 and 30% by weight of the mixture of said elastomeric block copolymer (b) and said elastomeric block copolymer (c) wherein the proportion of said elastomeric block copolymer (b) to said elastomeric block copolymer (c) is 4:1 to 1.5:1, and between 4 and 20% by weight of said polybutadiene (d) by weight.

10. A method for adhering materials, comprising adhering one material to another with the composition of claim 1.

11. The composition as claimed in claim 1, wherein said polybutadiene (d) is a functionalized polybutadiene.

12. The composition of claim 11, wherein said functionalized polybutadiene comprises vinyl terminal groups.

13. The composition of claim 1, wherein said polybutadiene (d) is a liquid polybutadiene.

14. The composition of claim 1, wherein said polybutadiene (d) is a blend of a functionalized polybutadiene and a non-functionalized polybutadiene.

15. The method of claim 9, wherein said polybutadiene (d) is a functionalized polybutadiene.

16. The method of claim 15, wherein said functionalized polybutadiene comprises vinyl terminal groups.

17. The method of claim 9, wherein said polybutadiene (d) is a liquid polybutadiene.

18. The method of claim 9, wherein said polybutadiene (d) is a blend of a functionalized polybutadiene and a non-functionalized polybutadiene.

19. The method of claim 9, wherein said composition comprises between 6 and 15% of said polybutadiene (d) by weight.

20. The method of claim 9, wherein said composition comprises between 15 and 25% by weight of the mixture of said elastomeric block copolymer (b) and said elastomeric block copolymer (c).

* * * * *